United States Patent [19]

Mercil

[11] 4,387,803
[45] Jun. 14, 1983

[54] ABSORBENT DEVICE FOR CONTAINERS FOR SUGAR, SALT, ETC.

[76] Inventor: Robert A. Mercil, Star Rte., Box 315, Wetmore, Mich. 49895

[21] Appl. No.: 208,884

[22] Filed: Nov. 21, 1980

[51] Int. Cl.³ .................... B65D 81/24; B65D 83/06
[52] U.S. Cl. .................................. 206/204; 222/190; 312/31; 312/31.1
[58] Field of Search ................ 206/204, 219, 0.5; 222/190; 312/31, 31.1

[56] References Cited

U.S. PATENT DOCUMENTS

| | | | |
|---|---|---|---|
| 871,803 | 11/1907 | Kendall | 222/190 |
| 1,252,872 | 1/1918 | Yoggerst et al. | 312/31.1 |
| 1,947,600 | 2/1934 | Isenhower | 312/31.1 |
| 2,596,763 | 5/1952 | Crowley | 312/31 |
| 2,619,448 | 11/1952 | Larsen | 206/219 |
| 2,994,404 | 8/1961 | Schifferly | 206/204 |
| 3,043,424 | 7/1962 | Howard | 206/219 |

*Primary Examiner*—William T. Dixson, Jr.
*Attorney, Agent, or Firm*—Paul H. Gallagher

[57] ABSTRACT

A perforated inner container is secured in a main container for sugar, or salt, or spices, etc., referred to as condiments. An absorbent material is placed in the inner container. The absorbent material may be rice, for example, or pieces of crackers, etc. The inner container is provided with perforations small enough to confine the absorbent material, but they admit air to freely flow therethrough. The inner container is removable, for enabling placing the absorbent material therein, or changing it. In one of the forms, also, the inner container is mounted for swinging motion to physically loosen the condiment in the main container.

4 Claims, 11 Drawing Figures

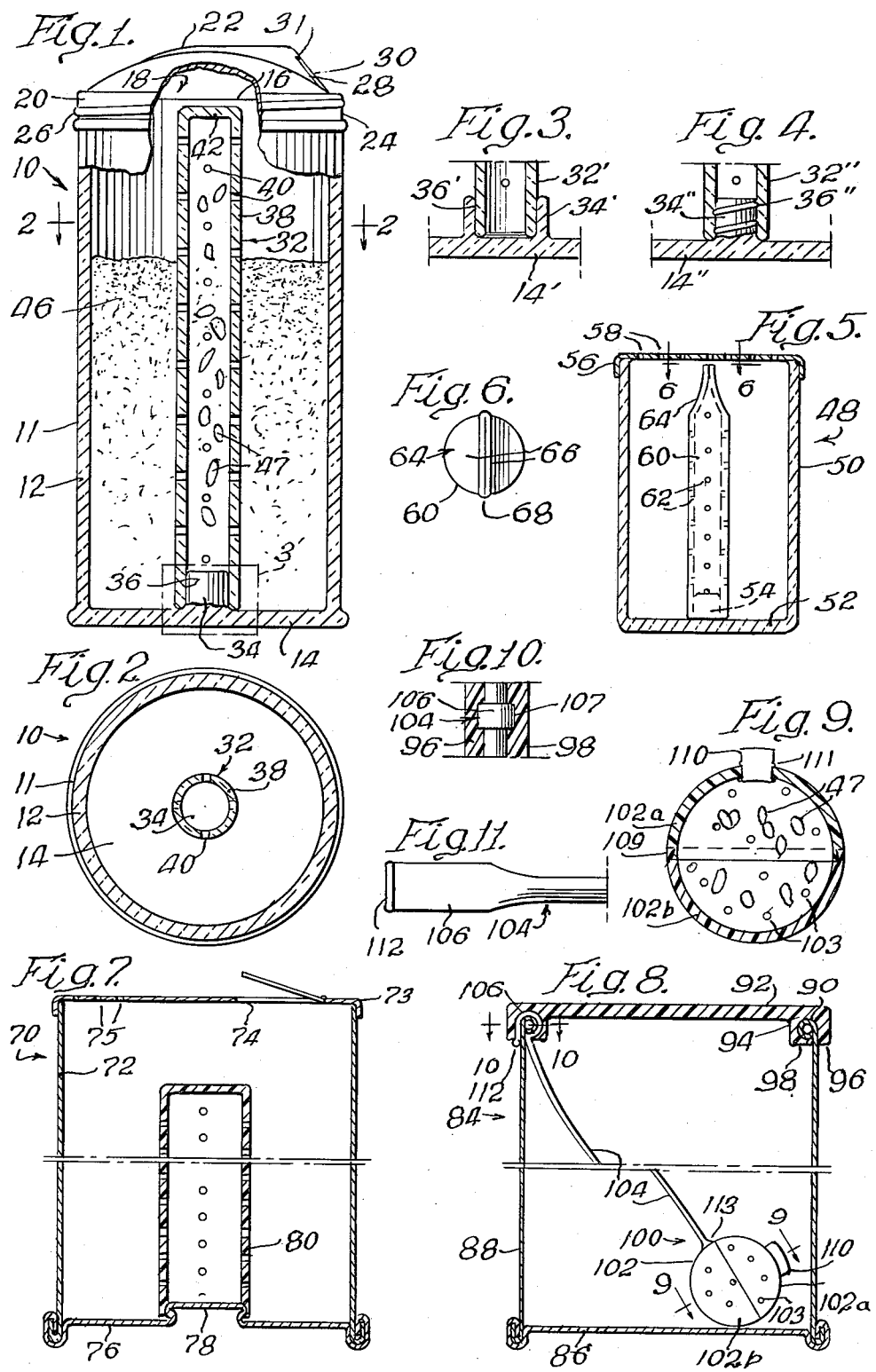

ABSORBENT DEVICE FOR CONTAINERS FOR SUGAR, SALT, ETC.

FIELD OF THE INVENTION

The invention has to do with containers for sugar, salt, pepper, spices, or other items where the control of moisture is a factor. Those materials absorb moisture readily, and when placed in containers, often absorbent materials are placed therein to absorb the moisture in them so as to make them readily fluent. When the absorbent materials are so placed in them in loose form, as they usually are, they are unsightly when on the table, and particularly so in a restaurant where the contaners are put before the patrons, but also the absorbent materials may tend to fall out, as in the case of sugar containers having relatively large openings.

The generic term "condiments" is used herein, for convenience, to include sugar, salt, spices, and all similar materials where the moisture is to be controlled, even though certain of them may not be known by that term in ordinary use.

OBJECTS OF THE INVENTION

A broad object of the invention is to provide novel means in a condiment container, for holding an absorbent material for absorbing moisture from the condiment, which confines the absorbent material against general intermixture with the condiment.

Another object is to provide means of the foregoing nature, wherein the following advantages as to construction and use are achieved:

(a) The device is very simple, rendering it inexpensive to produce, and easy to use.

(b) Because it precludes general intermixture of the absorbent material with the condiment, a more pleasing appearance of the condiment is presented.

(c) It prevents the escape of the absorbent material with the condiment, when the condiment is removed from the container, whether by pouring, by shaking, or by dipping.

(d) It prevents possible clogging by the absorbent material of the openings, such as small holes, in the passage of the condiment through those openings in the normal use of the container.

(e) It is detachably connected to the container, enabling filling, emptying and cleaning.

DESCRIPTION OF A PREFERRED EMBODIMENT

In the drawings:

FIG. 1 is a vertical sectional view through a sugar container incorporating the device of the present invention;

FIG. 2 is a view taken at line 2—2 of FIG. 1;

FIG. 3 is a fragmentary view of an alternate construction of the device of FIG. 1, showing that portion enclosed in dot-dash lines and indicated at 3;

FIG. 4 is a view similar to FIG. 3 showing another alternate form;

FIG. 5 is a vertical sectional view of a salt shaker containing the device of the present invention;

FIG. 6 is a view taken at line 6—6 of FIG. 6;

FIG. 7 is a vertical sectional view of a spice can embodying the features of the invention;

FIG. 8 is a vertical sectional view of a spice can embodying another form of the invention;

FIG. 9 is a sectional view taken at line 9—9 of FIG. 8;

FIG. 10 is a sectional view taken at line 10—10 of FIG. 8; and

FIG. 11 is an enlarged detail view of the upper end of the tether of FIG. 8, with the hook thereof in flattened position.

Referring in detail to the drawings, FIG. 1 shows the invention incorporated in a sugar container. In this view, the container is indicated as a whole at 10, which includes a main body 11 having a surrounding cylindrical wall 12 and a bottom element 14, with an upper edge 16 defining a top opening 18.

The surrounding wall 12 has exterior threads 20 adjacent the top, on which is detachably secured a cap or closure member 22 of suitable shape, such as dome shape as shown, including a lower surrounding band portion 24 having internal threads 26 detachably threaded on the threads 20. The cap 22 has an opening 28 covered by a cover or lid 30 in the form of a simple flap hinged as at 31 at its upper edge. Normally the lid 30 falls down into closing position as shown. The sugar container described above is of a kind generally known, being designed specially for restaurant use.

The device of the present invention includes an inner container 32. The base element 14 of the container is provided with a central upstanding boss 34. The inner container is preferably cylindrical in shape having a surrounding wall 38 provided with a plurality of apertures 40 of a predetermined size referred to hereinbelow. The top end of the inner container member 32 is closed as at 42 in a suitable manner, preferably by an element integral with the surrounding wall 38. The lower end of the inner container 32 is dimensioned for friction fitting on the boss 34 at 36, and thus is detachably mounted thereon. The sugar in the container is indicated at 46.

As is of course generally known, sugar absorbs moisture quite readily, and in doing so it hardens or cakes, and of course does not flow when in that condition. In the use of the device of FIG. 1, the user or patron usually tips it over to pour the sugar out through the opening 28, but the caked sugar of course does not flow. To overcome such difficulty, usually an absorbent material is placed in the sugar, various ones of which will serve the general purpose. As is known also, rice is a very good absorbent material for this purpose, but in the case of a sugar container having an opening 28 of the desired size for pouring sugar, the rice would flow through that opening, and to prevent that happening, very often other absorbent materials are used instead, such as pieces of soda crackers, sufficiently large as not to pass through that opening. Since the container of the kind represented in FIG. 1 is ordinarily used in restaurants, it is very significant that a pleasing appearance be presented. Broken pieces of crackers are not attractive, since they can be seen in the usual cases where the containers are transparent.

The device of the present invention overcomes such difficulty. In use, the inner container 32 is detached, and rice 47 is introduced thereinto, and then it is replaced in position. The apertures or holes 40 are smaller than the grains of rice, those grains ordinarily being of uniform size. Accordingly, the rice is confined within the inner container and does not mix generally with the body of the sugar 46. However, the holes are sufficiently large to enable air and moisture or vapor to readily pass therethrough into contact with the rice. Portions of the sugar may also pass through the openings and come in contact with the rice, enhancing the absorbing action. The moisture migrates from the main body of sugar through the holes into the inner container, and the whole body of sugar need not pass into contact with the rice. The inner container can be easily removed at any time it is desired to empty it, or to replace the rice in it periodically for facilitating the absorption of the moisture, and for cleaing purposes.

The length of the inner container 32 may be as desired, such as, in the present case, where it terminates upwardly adjacent the upper edge 16 of the main container. The principal consideration in this feature is that the upper end be positioned for easily grasping by the fingers for removing it and replacing it, and thus, it may be longer or shorter than that indicated.

It will be understood that any absorbent material desired may be utilized, as well as or instead of rice.

While sugar containers may be made of any of a wide variety of materials, ordinarily they are made of glass, and in keeping therewith, the inner container 32 may as well be made of glass. It is understood of course that the invention is sufficiently broad to cover any materials desired. Usually the cap or closure member 22 is of metal, but in this case also the particular material used may be as desired.

The preferred form of the bottom element 14 and boss 34 is as shown in FIGS. 1 and 2, where the surrounding wall 38 is fitted over the boss, but FIGS. 3 and 4 show alternate constructions that may be utilized, if desired. In the latter figures, corresponding elements are identified by the same reference numerals as in FIGS. 1 and 2 but with prime indications. In FIG. 3 the bottom element 14' has a boss 34' that is annular in shape, and the inner container 32' is fitted thereinto with a friction fit. In this case also, the inner container 32' is detachably mounted in position.

In FIG. 4 the boss 34" and inner container 32" are threaded, at 36", and so detachably connected together. As used herein, friction fitted encompasses both sliding fit connection and threaded connection. The constructions of FIGS. 1-4 may be selected according to such factors as appearance, or ease in facility in molding or other fabricating techniques.

FIGS. 5 and 6 show a salt shaker or pepper shaker 48 including the features of the present invention. The arrangement of FIG. 5 is generally the same as that of FIG. 1 but with minor modifications. In the case of the salt shaker 48, the container proper is indicated at 50 and has a bottom element 52 with a central upstanding boss 54. A cap or lid 56 is threadedly and removably secured to the upper open end of the container 50. As usual, the container proper 50 may be made of glass, and the cover 56 of metal. The cover 56 is provided with a plurality of holes 58 for shaking the salt therethrough.

In the present case, the salt shaker 48 incorporates an inner container 60 generally similar to the inner container 32, having apertures 62 and mounted in place by any of the structures of FIGS. 1-4. However it is provided with a top element 64 that differs from the element 42 of FIG. 1. In the present case the element 64 has a pinched shape with opposed concave sides 66 converging upwardly into a single flat, thin fin 68. Usually a salt shaker is much smaller than the sugar container represented in FIGS. 1 and 2, and therefore it is more difficult for the person handling the salt shaker, such as a waitress filling it, to insert her fingers thereinto to grip and manipulate the inner container 60. The special-shape top element 64 facilitates so grasping it. It is desired that the inner container 60 extend upwardly as far as practical, to facilitate gripping it, and therefore it may closely approach the very top, nearly into engagement with the closure 56.

In the case of the salt shaker 48, the holes 58 in the cap through which the salt is shaken, are of course smaller than the opening 28 of the sugar container of FIG. 1. Even though these holes are smaller than the usual size of rice, and those grains would not be shaken out, nevertheless the placement of rice loose in the body of salt in the shaker is not a pleasing or attractive appearance, and thus the provision of the inner container 60. Even though the user or patron may be able to see the rice or other absorbent material within the inner container, when the latter is transparent, he observes that the main body of the material (sugar or salt) is clear without the presence of absorbent material therein. This is an attractive feature and attracts the attention of the user beyond what may be accomplished by the fact that the absorbent material would not be expelled from the container.

Difficulties and annoyances of the character referred to, that is, the collection of moisture in the material to be consumed, or condiments, is most pronounced in the case of sugar and salt. One reason for this is that they are most often used, and used by more people, than other materials. Spices absorb moisture, as noted, and readily become caked in the container, and are then difficult to remove therefrom, as in cooking where it is desired to dip them out or shake them out. FIGS. 7 and 8 show the invention applied to a spice container, thus overcoming the difficulties and annoyances mentioned.

FIG. 7 shows a spice can 70, of metal as usual, having a surrounding wall 72 and a lid 73 provided with an opening 74 or apertures 75 enabling dipping or shaking the spice out, and a bottom element 76 secured to the wall 72 in a known manner. The bottom element has a central boss or button or shaped protrusion 78 over which is fitted an inner container 80, in all material respects like the inner container 32.

The inner container 80 may be of plastic material for example, and consequently sufficiently yieldable to snap over the boss. However, it may be fitted thereon in any known and desired manner, preferably removably so; any of the forms of FIGS. 1-4 may be utilized.

FIG. 8 shows another form of spice can embodying the basic principle of the previous constructions, in a modified form. In this figure, the spice can 84 may be of conventional construction including a flat bottom 86 and a surrounding wall element 88 terminating in a bead 90. The lid 92 has a surrounding down-turned bead 94 split to form an outer element 96 and an inner element 98. The can may be of metal, but the lid is preferably of plastic and preferably flexible, enabling the bead elements 96, 98 to be snapped over the bead and yieldingly hold the cover thereon.

The inner container in the present case is indicated at 100 and includes a hollow sphere 102, perforated at 103, on a tether or string or band 104 having a hook 106 at the extended end. The hook is fitted over the bead 90 of the can, and the bead elements 96, 98 of the cover snapped over the hook, holding the inner container in place. Preferably the elements 96, 98 are notched as at 107 (FIG. 10) to receive the hook and enable the lid to fit down tight. The inner container preferably is of a plastic material, being made up of halves 102a and 102b secured together in a suitable manner such as by providing an interlocking formation 109 (FIG. 9) and snapping them together, the plastic material yielding sufficiently for this purpose. The absorbent material is inserted in the hollow sphere, and the halves then snapped together, a removable plug 110 being provided for facilitating insertion of the absorbent material into the sphere. The plug is merely forced into place, being held in place by ribs 111.

The tether or line 104 is also preferably of plastic material and integral with the sphere half 102b. The tether for the most part is round in cross section, and flattened in the hook 106, and a radius is formed at 113 flaring into the sphere half. The hook 106 is of course an integral part of the tether, and may have a knob or enlargement 112 on its extended end to prevent its being pulled from its clamped position inwardly of the can. FIG. 11 shows the hook in flattened position, or developed view.

The inner container 100 is thus secured in the can, and has this feature in common with the other forms. The rice or other absorbent material in the sphere absorbs the moisture from the spice as in the previous cases, and this construction provides an additional advantage in that the can may be shaken or tapped on a counter top, and the sphere being free to swing, is made to swing against the spice and break or dislodge any caked portions. This last feature is particularly advantageous in the case of large containers such as are used in commercial places, as restaurants. The absorbent material may be introduced by the producer of the spice in an operation related directly to the introduction of the spice in the can. Such cans are ordinarily of throwaway character and hence the inner container would not be re-filled, but the construction is of great advantage in putting up the cans of spice.

Ordinarily, spice cans of small size are provided with plastic lids while those of large size, such as those used in commercial establishments, e.g., restaurants, are provided with metal lids, but in either case, the lid is shaped to accommodate the hook 10 and it holds the tether securely.

A great advantage of the invention is that the device while providing the benefits referred to above, is nevertheless simple in both manufacture and use, being therefore inexpensive to manufacture, and simple for use by the user.

I claim:

1. A container for condiment, comprising, a main container generally closed, having an imperforate bottom element, a surrounding wall defining a top opening, and a removable perforated cover, and an inner container of tubular form having an open lower end and a closed upper end, the bottom element and the inner container including interconnecting elements capable of releasably mounting the inner container on the bottom element in response to manipulating the inner container by manually grasping it at its upper end, the inner container being of such length as to terminate closely adjacent the top opening of the main container, the inner container being made of material that is rigid and generally continuous but with dimensionally defined holes therethrough spaced apart substantial distance relative to the size of the holes, the holes being of such size as to confine granular material of relatively large size such as rice against escape therethrough, but to enable granular material of relatively small size such as sugar and salt to pass therethrough.

2. A container for condiment according to claim 1 wherein, said interconnecting elements include an upstanding boss on the bottom element, and the inner container is friction fitted thereon.

3. A container for condiment according to claim 1 wherein, the main container and the inner container are made of transparent material.

4. A container for condiment according to claim 1 wherein, the upper end of the inner container has a pinched shape, providing a generally flat transverse fin to facilitate grasping of the inner container by the fingers, despite restricted space within the main chamber which renders it difficult to insert the fingers thereinto.

* * * * *